Sept. 7, 1954    J. A. LOVE    2,688,283
LIFT TYPE AGRICULTURAL IMPLEMENT
Filed Feb. 17, 1947    2 Sheets-Sheet 2

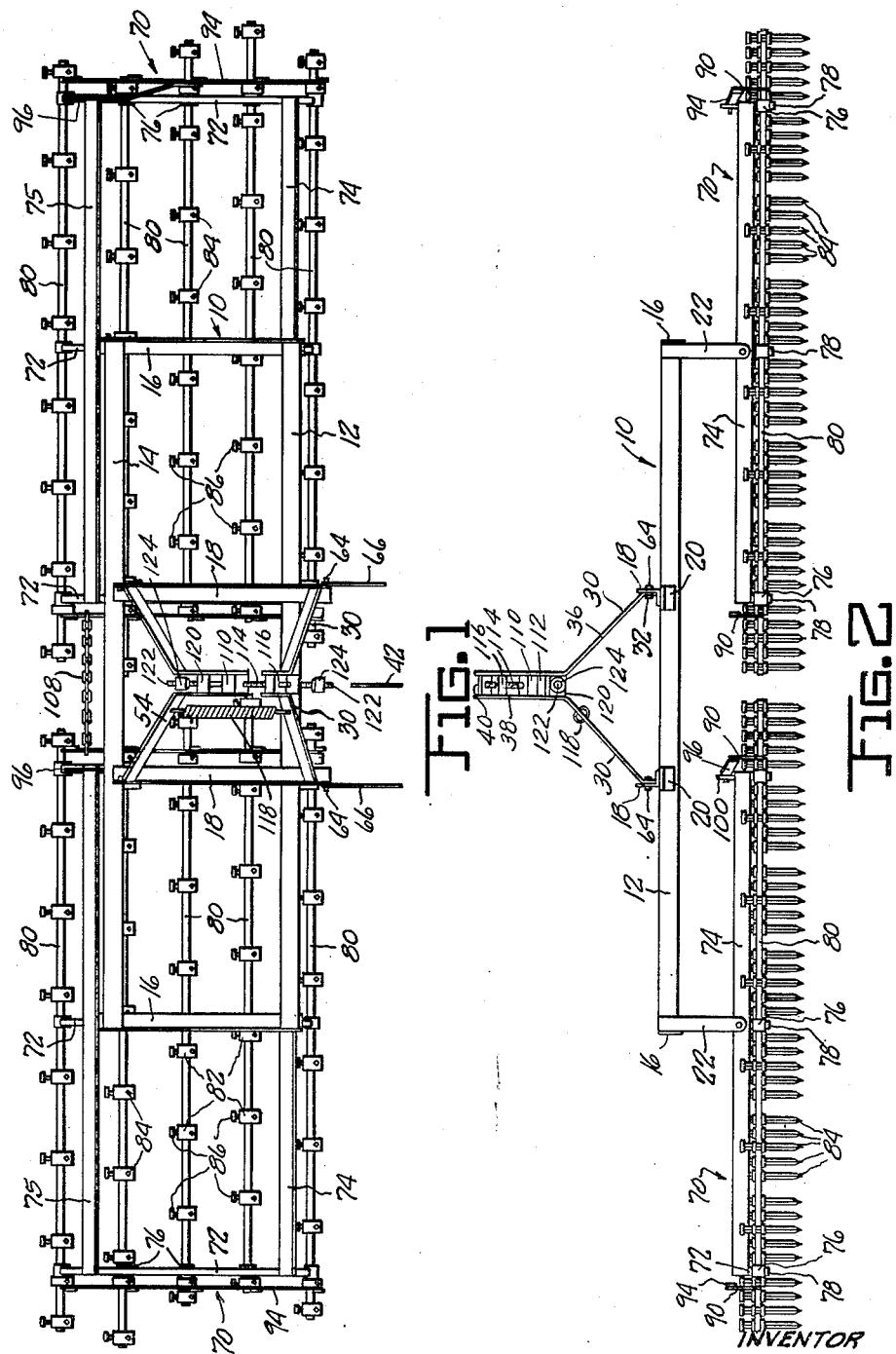

INVENTOR
JABEZ A. LOVE.
BY
Oltsch + Knoblock
ATTORNEYS.

Patented Sept. 7, 1954

2,688,283

UNITED STATES PATENT OFFICE 2,688,283

LIFT TYPE AGRICULTURAL IMPLEMENT

Jabez A. Love, Silver Creek Township,
Cass County, Mich.

Application February 17, 1947, Serial No. 728,977

9 Claims. (Cl. 97—47.88)

This invention relates to improvements in lift type agricultural implements, and particularly to lift type harrows, such as spike tooth harrows.

The implement is particularly designed for use with and connection to a power-actuated lift hitch mounted upon a tractive vehicle, said hitch being of the three-point connection type and serving to draw or tow the implement in desired working position and to be actuated in a lifting movement to lift the implement above ground level for ready transport without necessitating disconnection of the implement from the tractor or the provision of special supporting means beneath the implement to sustain the weight thereof during transport.

The primary object of the invention is to provide an implement of this character having a rigid frame to which ground-working tools are connected with three connectors spaced vertically and horizontally, wherein at least one connector is adjustable to vary the working angle or attitude of the implement and to accommodate connection of the implement to hitch mechanism of the three-point connection type but of different types and constructions.

Other objects will be apparent from the following specification.

In the drawing:

Fig. 1 is a top plan view of the implement.

Fig. 2 is a view of the implement in front elevation.

Figure 3:
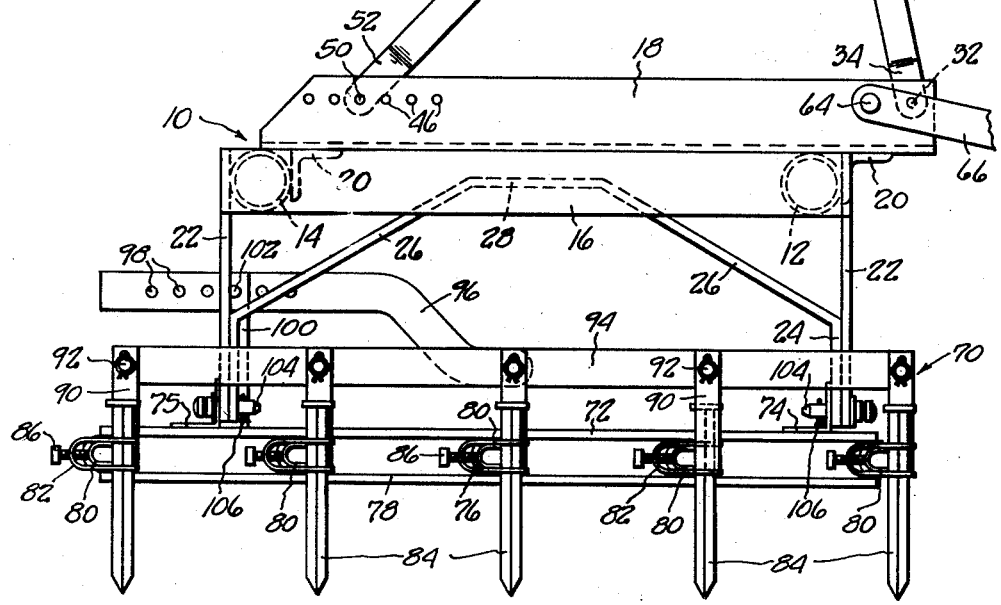
Fig. 3 is a view of the implement in side elevation.

Referring to the drawings wherein the implement has been illustrated as a spike tooth harrow, the numeral 10 designates a rigid frame which is preferably formed from a front rigid transverse frame member 12 and a rear transverse frame member 14 in rearwardly spaced parallel relation to the member 12. As herein illustrated, the frame members 12 and 14 preferably constitute metal tubular members of substantial strength and rigidity, although it will be understood that frame members formed of other structural shapes or characteristics may be employed. The ends of the frame members 12 and 14 are rigidly connected by longitudinally extending structural members 16, such as angle-irons or like structural forms, which are welded or otherwise fixedly secured to the frame members 12 and 14. A pair of longitudinal cross braces 18 are rigidly secured to the frame members 12 and 14 in spaced relation at the intermediate portion of said frame members 12 and 14 and preferably in equally spaced relation to the ends of said frame members adjacent thereto. The frame members 18 are preferably welded to the members 12 and 14 and may further be supported by short angle-iron elements 20 welded to the frame members 12 and 14. The frame members 18 preferably project forwardly from the front frame member 12, as best seen in Figs. 1 and 3. At each corner of the rigid frame 10 is fixedly secured a depending rigid frame member 22, the frame members 22 at each end preferably being longitudinally aligned and being of the same height. An arch-shaped rigid reinforcing member connects the lower free ends of the members 22 with the end member 16 of the rigid frame and preferably comprises ends 24 which are welded or otherwise rigidly secured in face engagement with the lower end portions of the members 22, inwardly inclined rigid portions 26, and a central integral portion 28 which is welded or otherwise secured to the adjacent end member 16. It will be understood that the construction of frame members may be varied from the form being shown and may be strengthened by additional bracing and reinforcing means, the primary characteristic of the frame being its rigidity and the provision at each corner of a rigid depending member.

A pair of rigid arms 30 are pivoted at 32 in transverse alignment at the front of the frame, and, as here illustrated, are pivoted to the forwardly projecting portions of the frame members 18. These members 30 preferably include vertical end portions 34 adapted to bear against the vertical flanges of the members 18, central upwardly converging portions 36, and vertical upper terminal portions 38 which are interconnected by a removable cross-pin 40 forming a connector to which one arm 42 of a power-operated hitch mounted upon a tractive vehicle is adapted to be detachably connected. The portions 38 of the arms 30 rotatably mount a block 116 therebetween in spaced relation below the cross-pin 40. The rear end portions of the frame members 18 have longitudinally spaced sets of apertures 46 formed therein, each in transverse alignment with a corresponding aperture in the other frame member 18. A pair of rigid arms 48 are pivotally connected with selected transversely aligned apertures 46, for example, at 50, at their lower end portions 52 which preferably extend in a vertical plane parallel to the flanges of the frame members 18. The intermediate portions 54 of the arms 48 converge inwardly and terminate in spaced upper end portions 56 positioned in vertical planes and having interposed and fixedly secured therebetween a stop 112. A block 110 is pivotally mounted between parts 56 and having a projection engageable with stop 112. The block 110 has a socket rotatably receiving a head or enlargement on one end of an elongated screw-threaded shaft 114. The block 110 has a screw-threaded bore in which the shaft 114 fits adjustably.

A tension spring 118 connects the arms 30 and 48, as at the lower ends of parts 38 and 56 thereof. The spring 118 serves normally to hold the arms 30—48 in the position shown in Fig. 3 with the shaft 114 substantially aligned with or at a slight angle to the portions 56 of arms 48, said position being determined by the point of contact between the projection of block 110 with the stop 112.

Figure 4:
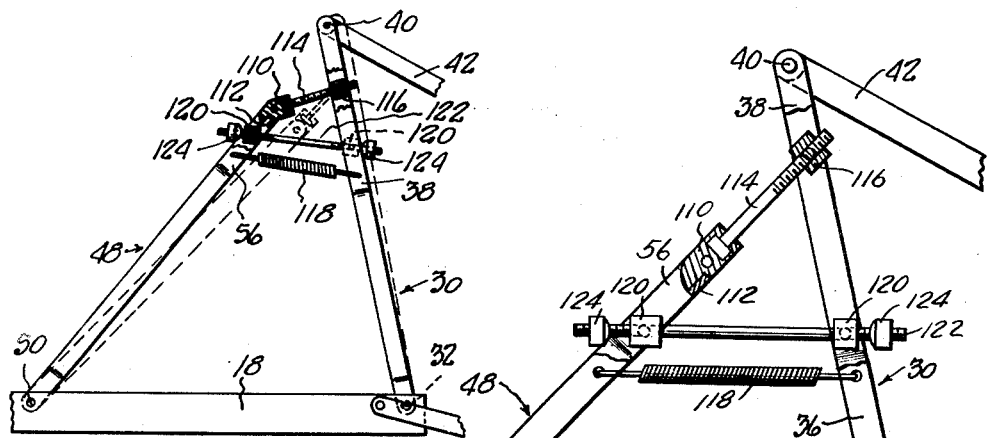
Fig. 4 is a fragmentary side view of the implement frame in a flexed position.

It is desirable in such a longitudinally flexible structure to limit the extent to which the arms 30—48 may pivot. Means for accomplishing this function are shown in Fig. 4 in the nature of blocks 120 pivoted between the portions 38 and 56 of said arms adjacent to the spring 118. These blocks have bores therethrough in which a rigid rod 122 is freely slidable. The ends of the rod are preferably screw-threaded and adjustably mount enlarged heads 124 which may be spaced apart any selected distance. It will be apparent that the arms 30 and 48 form an upwardly projecting structure constituting two rigid arm units interconnected by the threaded shaft 114. Upon rotation of the threaded shaft 114 the length of the rear arm assembly and the position of the front arms 30 are adjusted. Thus the position of the connecting pin 40, to which the hitch element 42 is connected, will be adjusted to selected position relative to the frame. The range of adjustment is dependent upon the length of the shaft 114 and involves a swinging movement of the arms 30 about their axes 32 which adjusts the position of the pin 40 both longitudinally of the frame and vertically of the frame. This adjustment may be regulated in small increments by rotation of the screw shaft 114, and the superstructure may be adjusted in large increments by altering the connection 50 of the arms 48 with the frame member 18 at one of the plurality of longitudinal positions defined by the apertures 46.

Each of the frame members 18 has a rigid pin 64 secured thereto and projecting transversely therefrom adjacent its forward end. These pins 64 form connectors to provide a pivotal connection for the arms 66 which, with the arm 42, constitute the three connecting arms of the lower lift hitching mechanism (not shown) mounted upon the tractive vehicle.

A plurality of ground-working implements, here shown as spike tooth harrow sections 70, are adapted to be carried by the rigid frame 10 in depending relation. Each of the harrow sections includes a plurality of longitudinally extending spaced rigid frame members 72, preferably three in number and equally spaced. The frame members 72 are rigidly connected by transverse front frame members 74 and rear frame members 75, such as angle-irons, welded or otherwise secured thereto. Each of the longitudinal frame members 72 has fixedly secured thereto in equi-spaced relation along its length a plurality of collars 76 which form journals and which are rigidly connected at their lower ends by longitudinal bars 78 below and parallel to the members 72. Within the collars 76 are rotatably mounted elongated rigid transverse spike-carrying bars 80 which are of equal length but are positioned in staggered relation transversely of the implement, as best seen in Fig. 1. The bars 80 are preferably of channel-shape in cross-section. At equally spaced points along the length of the bars 80 are mounted clamps 82 which fit around said bars and are of U-shaped form provided adjacent their free end with apertures to receive spike teeth 84 therethrough. The spike teeth 84 bear against the edges of the U-shaped or channel-shaped bars 80 and are drawn into firm engagement with said edges by screws 86 threaded in the yoke of the clamp and pressing against the bars 80, as best illustrated in Fig. 3. By this construction the spikes 84 are mounted rigidly yet detachably and replaceably. By virtue of the staggered relation of the bars 80 and the mounting of the same number of spikes upon each bar at the same spacing, it will be apparent that the spike teeth are disaligned longitudinally from all of the other spike teeth so that the action of the spike teeth upon the ground worked thereby will be uniform and the soil will be evenly worked, smooth, leveled and broken into small parts thereby.

At opposite ends of the bars 80 of each spike section are welded or otherwise fixedly secured upwardly extending bars 90 of equal length to which are pivotally connected at 92 longitudinally extending bars 94. One of the bars 94 of each spike section, here shown as the left bar of each section as viewed in Fig. 1, has fixedly secured thereto a handle 96 offset upwardly from said bar 94 and extending longitudinally thereof. As best illustrated in Fig. 3, the handle 96 is secured to the bar 94 substantially centrally of the length thereof. The rear end of each handle unit 96 is provided with a plurality of longitudinally spaced apertures 98. A rigid bar 100 is welded or otherwise fixedly secured to the rear transverse frame member 75 adjacent to the handle 96 and is apertured to receive a pin 102 which extends through one of the apertures 98 of the handle 96 and thereby adjusts and locks the handle 96 in selected longitudinal adjustment. It will be apparent that when the pin 102 is removed, the handle 96 may be moved longitudinally, forwardly or rearwardly, thereby similarly shifting the longitudinal bars 94 and tilting the bars 90 to a selected angle whereby the spike-carrying bars 80 and the spikes 84 are tilted relative to vertical. When this adjustment has been effected, the pin 102 is inserted through the aperture 98 registering with the aperture in the bar 100 so that the angular tilted adjustment of the spikes 84 is effectively maintained at the desired adjustment.

The spike sections are detachably connected to the lower ends of the frame members 22 by means of pins 104. The pins 104 at each end of the frame are positioned in axial alignment with like pins at the other end of the frame so that the spike sections may tilt about a longitudinal axis. The pins 104 may be of any conventional type, one aligned set being preferably removable and the other set being anchored to the frame members 22. The pins may be provided with cotterpins or like detachable means 106 for holding the parts against release, but permitting disconnection of the parts by merely pulling the cotterpin or like latching element. The transverse points of the frame members 74 and 75 of the spike sections at which the pins 104 are anchored are preferably at the center of the unit and substantially at the longitudinal balance axis of the sections so that the spike sections will tend to remain substantially parallel to the frame 10 by which they are suspended when the frame is lifted bodily by the arms 42 and 66 of the lift hitch mechanism. At the same time the connection of the spike sections with the main frame solely upon a longitudinal axis defined by the aligned pins 104 provides a flexible connection between the spike sections and the main frame so that the spike sections are free to follow the contour of the ground transversely of the direction of draft. Any suitable means may be provided for limiting the relative angular movement of the spike sections, which means are here illustrated in Fig. 1 as slack chain 108 connecting transversely aligned points of the adjacent spike sections and of such a length that the chain will become taut and prevent further relative angular movement of the spike sections after a predetermined limited extent of such relative pivotal movement has been reached. The use of such pivot limiting means 108 is optional and serves primarily to prevent accidental tilting or pivoting of either of the spike sections to an extent permitting the same to contact the ground when the implement as a whole has been lifted by the lift hitch.

While the implement has been described and illustrated as constituting a spike tooth harrow, it will be apparent that the frame 10 and the superstructure thereof may be employed in other types of agricultural implements, such as spring tooth harrows, disk harrows, drags and the like, by simply providing thereon at the proper positions the necessary means for connecting to said frame the ground-engaging sections which are characteristic of such other implements.

One of the primary advantages of the spike tooth harrow illustrated is that it enables all of the advantages and features characteristic of drawbar type spike tooth harrows to be incorporated therein, for example, this implement of the lift hitch type provides a flexible connection of the spike sections with the main frame, permitting the sections to follow the contour of the ground. It will be noted, however, that the flexibility does not interfere with the controlled lifting of the implement as a unit to a position above ground level for transport purposes. Still another advantage of the spike tooth harrow shown is that the spike sections may be quickly and easily detached. The side-by-side arrangement of the spike sections in this implement entails an overall transverse dimension which is quite large and which may be greater than the width of many gates and of the doors of implement storage buildings. Thus it is possible by the instant construction, when a farmer is transporting the spike harrow from field to field where he must pass through gates or doorways narrower than the overall width of the implement, to disconnect one or both of the spike sections from the frame while the tractor is driven through the gate or doorway and the disconnected section or sections, which constitute only a small portion of the total weight of the implement, can readily be carried through the narrow gate or doorway and then reconnected. Alternatively, it is possible to perform this operation in the case of a doorway wide enough to accommodate the tractor and the implement with only one spike section connected, to disconnect one spike section when the gate is reached, drive through the gate and disconnect the remaining spike section, thereupon drive the tractor back through the gate and re-connect the first spike section to the frame, and then drive through the gate or opening and re-connect the second spike section to the frame.

The superstructure is of great advantage in this device. The spring 118 normally holds the superstructure in the position shown in Fig. 3. Thus the spring 118 is of a strength exceeding the force normally acting on the rear end of the implement and tending to tilt the implement to a forwardly inclined position in use, which force is resisted by the compression link or arm 42 of the lift hitch mechanism to which the implement is connected. However, if, due to the contour of the ground, the engagement of an obstruction by the implement, or any other operating condition, the force against which the link 42 acts is increased to a point at which it becomes greater than the strength of the spring, the superstructure is free to shift to the full line position in Fig. 4 in response thereto. When the operating conditions return to normal, the spring returns the parts to the normal operating position. Thus the superstructure imparts to the implement a longitudinal flexibility in addition to the inherent lateral flexibility of its pivoted ground-engaging parts.

The provision of the stops 122, 124 is important in the device. This arrangement permits sufficient movement of the arms to accommodate a selected range of tilting of the implement frame, and at the same time insures that the spring 118 will not be extended excessively and beyond its limits, and further prevents undesired pivotal movement to an extent which would prevent normal functioning of the spring to return the parts to the normal position shown in Fig. 3 when operating conditions return to normal.

While the form of the invention herein shown is the preferred form as applied to a spike tooth harrow, it will be understood that changes may be made in the invention within the scope of the appended claims without departing from the spirit of the invention.

I claim:

1. In a lift type agricultural implement, a rigid frame adapted to mount ground-working tools, connectors carried by said frame for attachment to tension members of a lift hitch mechanism carried by a tractive vehicle, a pair of rigid arms pivoted to said frame at the front thereof and converging upwardly, at least one rigid arm pivoted to the rear of said frame, a link pivotally connected at its ends to the upper ends of said front and rear arms, a spring connecting said front and rear arms and normally urging them to a predetermined position relative to each other and to said link, and a connector carried by the upper ends of said front arms for attachment to a compression member of said lift hitch mechanism.

2. In a lift type agricultural implement, a rigid frame adapted to mount ground-working tools, connectors carried by said frame for attachment to tension members of a lift hitch mechanism carried by a tractive vehicle, and a superstructure including rigid front and rear arms pivoted to said frame, a link pivotally connecting the free end portions of said front and rear arms, a spring connecting said front and rear arms and normally urging them to a predetermined position, and a connector carried by said front arms for attachment to a compression member of said lift hitch mechanism.

3. In a lift type agricultural implement, a rigid frame adapted to mount ground-working tools, connectors carried by said frame for attachment to tension members of a lift hitch mechanism carried by a tractive vehicle, and a superstructure including rigid front and rear arms pivoted to said frame, a link pivotally connecting the free end portions of said front and rear arms, a spring connecting said front and rear arms and normally urging them to a predetermined position, and a connector carried by said front arms for attachment to a compression member of said lift hitch mechanism, the pivot connection between one end of said link and the associated arm including a stop carried by one thereof and engageable by the other.

4. In a lift type agricultural implement, a rigid frame adapted to mount ground-working tools, connectors carried by said frame for attachment to tension members of a lift hitch mechanism carried by a tractive vehicle, and a superstructure including rigid front and rear arms pivoted to said frame, a link pivotally connecting the free end portions of said front and rear arms, a spring connecting said front and rear arms and normally urging them to a predetermined position, and a connector carried by said front arms for attachment to a compression member of said lift hitch mechanism, said link being adjustable to vary the spacing between the pivot connections of said link with said front and rear arms.

5. In a lift type agricultural implement, a rigid frame adapted to mount ground-working tools, connectors carried by said frame for attachment to tension members of a lift hitch mechanism carried by a tractive vehicle, at least three rigid arms pivoted to said frame in longitudinally and transversely spaced relation, a rigid link pivotally connected at its ends to the upper ends of said arms, stop means for limiting relative pivotal movement of said link and one arm, and a spring extending between the longitudinally spaced arms to normally urge said parts toward each other to the limit position defined by said stop, and a connector carried by one arm for attachment to a compression member of said lift hitch mechanism to said arm.

6. In a lift type agricultural implement, a rigid frame adapted to mount ground-working tools, connectors carried by said frame for attachment to tension members of a lift hitch mechanism carried by a tractive vehicle, at least three rigid arms pivoted to said frame in longitudinally and transversely spaced relation, a rigid link pivotally connected at its ends to the upper ends of said longitudinally spaced arms, stop means for limiting relative pivotal movement of said link and one arm, and a spring extending between the longitudinally spaced arms to normally urge said parts toward each other to the limit position defined by said stop, and a connector carried by one arm for attachment to a compression member of said lift hitch mechanism to said arm, and means for limiting pivotal movement of said arms against the action of said spring.

7. In a lift type agricultural implement, a rigid frame adapted to mount ground-working tools, connectors carried by said frame for attachment to tension members of a lift hitch mechanism carried by a tractive vehicle, at least three rigid arms pivoted to said frame in longitudinally and transversely spaced relation, a rigid link pivotally connected at its ends to the upper ends of said longitudinally spaced arms, stop means for limiting relative pivotal movement of said link and one arm, and a spring extending between the longitudinally spaced arms to normally urge said parts toward each other to the limit position defined by said stop, and a connector carried by one arm for attachment to a compression member of said lift hitch mechanism to said arm, a pair of fixtures rotatably carried by longitudinally spaced arms, and a rigid elongated member supported by and longitudinally shiftable on said fixtures, said member having stops at its ends engageable with said fixtures to limit sliding of said member.

8. In a lift type agricultural implement, a rigid frame adapted to mount ground-working tools, connectors carried by said frame for attachment to tension members of a lift hitch mechanism carried by a tractive vehicle, at least three rigid arms pivoted to said frame in longitudinally and transversely spaced relation, a rigid link pivotally connected at its ends to the upper ends of said longitudinally spaced arms, stop means for limiting relative pivotal movement of said link and one arm, and a spring extending between the longitudinally spaced arms to normally urge said parts toward each other to the limit position defined by said stop, and a connector carried by one arm for attachment to a compression member of said lift hitch mechanism to said arm, a pair of fixtures rotatably carried by longitudinally spaced arms, and a rigid elongated member supported by and longitudinally shiftable on said fixtures, said member having stops at its ends engageable with said fixtures to limit sliding of said member, said stops being longitudinally adjustable on said member.

9. In a lift type agricultural implement, a rigid frame adapted to mount ground-working tools, connectors carried by said frame for attachment to tension members of a lift hitch mechanism carried by a tractive vehicle, at least three rigid arms pivoted to said frame in longitudinally and transversely spaced relation, a rigid link pivotally connected at its ends to the upper ends of said longitudinally spaced arms, stop means for limiting relative pivotal movement of said link and one arm, and a spring extending between the longitudinally spaced arms to normally urge said parts toward each other to the limit position defined by said stop, and a connector carried by one arm for attachment to a compression member of said lift hitch mechanism to said arm, a pair of fixtures rotatably spaced by longitudinally spaced arms and mounting opposite ends of said link, at least one end of said link being adjustably connected with its mounting fixture.

References Cited in the file of this patent

UNITED STATES PATENTS

| Number | Name | Date |
|---|---|---|
| D. 134,347 | Rude | Nov. 17, 1942 |
| 1,656,126 | Nixon | Jan. 10, 1928 |
| 1,852,212 | Murphy | Apr. 5, 1932 |
| 1,892,978 | Burch | Jan. 3, 1933 |
| 1,913,069 | Chance | June 6, 1933 |
| 2,335,175 | Davenport | Nov. 23, 1943 |
| 2,359,206 | Currie | Sept. 26, 1944 |
| 2,368,631 | Blalock | Feb. 6, 1945 |
| 2,414,114 | Martin | Jan. 14, 1947 |

FOREIGN PATENTS

| Number | Country | Date |
|---|---|---|
| 554,033 | Great Britain | June 16, 1943 |